(12) United States Patent
Carriero

(10) Patent No.: US 7,449,108 B2
(45) Date of Patent: Nov. 11, 2008

(54) APPARATUS FOR IMPROVING THE CHARACTERISTICS OF WETTING WATER IN OFFSET PRINTING

(75) Inventor: Antonio Carriero, Merone (IT)

(73) Assignee: Ecografica S.r.l., Merone (COMO) (IT)

( * ) Notice: Subject to any disclaimer, the term of this patent is extended or adjusted under 35 U.S.C. 154(b) by 433 days.

(21) Appl. No.: 11/077,238

(22) Filed: Mar. 10, 2005

(65) Prior Publication Data
US 2005/0199552 A1    Sep. 15, 2005

(30) Foreign Application Priority Data
Mar. 15, 2004    (IT)    .......................... MI2004A0484

(51) Int. Cl.
*B01D 33/00*    (2006.01)
(52) U.S. Cl. .................... 210/195.1; 210/196; 210/205; 210/222; 210/263
(58) Field of Classification Search .............. 210/195.1, 210/196, 205, 222, 263
See application file for complete search history.

(56) References Cited
U.S. PATENT DOCUMENTS
4,665,824 A * 5/1987 Greiner et al. .............. 101/492

5,704,190 A * 1/1998 Kaneko et al. .................. 53/51
6,053,106 A * 4/2000 Sauer .......................... 101/484

FOREIGN PATENT DOCUMENTS

| CH | 587194 A | * | 6/1977 |
| FR | 2206984 A | * | 9/1976 |
| GB | 2227758 A | * | 8/1990 |
| JP | 07304151 A | * | 11/1995 |
| JP | 2001205019 A | * | 7/2001 |
| JP | 2002253985 A | * | 9/2002 |

* cited by examiner

*Primary Examiner*—Chester T. Barry
(74) *Attorney, Agent, or Firm*—James V. Costigan; Hedman & Costigan, P.C.

(57) ABSTRACT

An apparatus for improving the characteristics of wetting water in offset printing comprises, in an operatively and functionally intercoupled relationship, a device for supplying the wetting water, a device for filtering the supplied wetting water, designed to provide an actively filtered wetting water, a plurality of magnets adapted to subject the filtered wetting water to a continuous and strong magnetic processing, a pH controlling device, adapted to control the wetting water pH at a preset acid pH value, and a device adapted to control the wetting water electrical conductivity at a set conductivity value.

9 Claims, 6 Drawing Sheets

APPARATUS FOR IMPROVING THE CHARACTERISTICS OF WETTING WATER IN OFFSET PRINTING

BACKGROUND OF THE INVENTION

The present invention relates to a method and apparatus for improving the characteristics of wetting water in offset printing.

As is known, an offset printing method conventionally uses, for printing, wetting water having target pH and conductivity values, of conventional printing inks.

More specifically, in offset printing, is conventionally used a plate cylinder, cooperating with a blanket cylinder, between which are fed sheet elements to be printed upon.

In such an offset method, it is very important to optimize the wetting water characteristics, to provide optimum printing results.

Methods and apparatus for improving wetting water characteristics in offset printing are already known.

However, prior methods and apparatus are very complex and usually provide to use a comparatively large amounts of isopropyl alcohol which, in addition to being very expensive, generates great environmental polluting problems.

Moreover, in prior methods and apparatus, it is not generally possible to automatically control the pH and conductivity values of the wetting water, in a fully independent manner.

SUMMARY OF THE INVENTION

Thus, in the light of the above mentioned drawbacks of prior methods and apparatus for controlling the characteristics of wetting water in offset printing, the main aim of the present invention is to provide such a method and apparatus for improving said characteristics of said wetting water in offset printing, allowing to automatically control the pH and conductivity values of the wetting water, and this in a fully independent manner.

Within the scope of the above mentioned aim, a main object of the present invention is to provide such a method and apparatus of the above indicated type, allowing to properly stabilize the wetting water characteristics or parameters, by performing a continuous read-out of the parameters of the return water, i.e. of the water returning from the printing elements.

Yet another object of the present invention is to provide a method and apparatus of the indicated type allowing to hold the wetting water in perfectly cleaned condition during its recirculation, by using a novel and unique filtering system.

Yet another object of the present invention is to provide such a method and apparatus, of the indicated type, which allow, moreover, to eliminating or reduce to a minimum, the use of isopropyl alcohol.

Yet another object of the present invention is to provide such a method and apparatus allowing to hold constant the printing quality and, more specifically, to hold in a stable condition the printing water-ink microemulsion.

Yet another object of the present invention is to provide such a method and apparatus allowing to greatly reduce the printing ink consume, thereby providing a novel water-ink equilibrium, requiring a lesser amount of water.

Yet another object of the present invention is to provide such an apparatus and method, of the above indicated type, allowing to improve the printing ink drying, thereby greatly reducing the waste materials.

Yet another object of the present invention is to provide a method and apparatus of the above indicated type, preventing limestone from forming, as a "hard" wetting water is used.

Yet another object of the present invention is to provide such a method and apparatus allowing to solve the environmental polluting problems due to the isopropyl alcohol emissions in printing rooms and the like.

Yet another object of the present invention is to provide such a method and apparatus which do not cause any chemical damages to the printing plates or the printing machine elements.

Yet another object of the present invention is to provide such a method and apparatus, of the indicated type, which can be easily expanded to fit any printing requirements, either in limited amounts and/or in mass.

According to one aspect of the present invention, the above mentioned aim and objects, as well as yet other objects, which will become more apparent hereinafter, are achieved by the subject method and apparatus for improving the characteristics of wetting water in offset printing.

More specifically, the method comprises at least the method steps of controlling and holding constant in time the pH value of the wetting water and controlling and holding constant in time the electric conductivity value of said wetting water.

The apparatus for carrying out the subject method comprises, operatively coupled to one another, at least wetting water supplying or feeding means, filtering means for filtering the supplied or fed wetting water, adapted to provide an actively filtered wetting water, magnetic means for subjecting the filtered wetting water to a continuous and strong magnetic treatment, pH control means adapted to control the pH of the wetting water at a preset acid pH value, and electric conductivity control means for controlling the electric conductivity of the wetting water, for holding at a preset conductivity value the electric conductivity of the wetting water.

BRIEF DESCRIPTION OF THE DRAWINGS

Further characteristics and advantages of the method and apparatus according to the present invention will become more apparent hereinafter from the following detailed disclosure of a preferred, though not exclusive, embodiment thereof, which is illustrated, by way of an indicative, but not limitative example, in the accompanying drawings, where.

DESCRIPTION OF THE PREFERRED EMBODIMENTS

Figure 1:
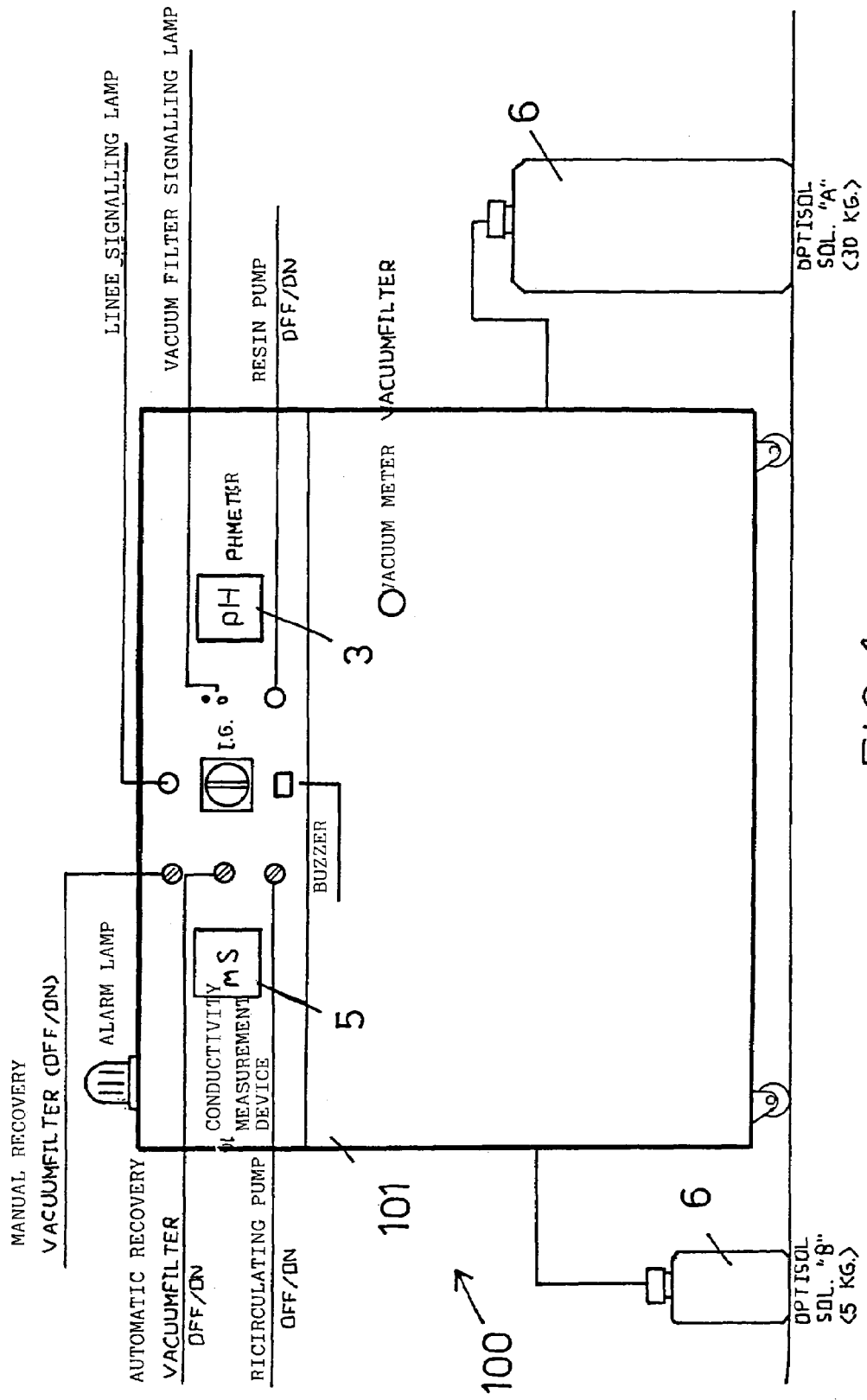
FIG. 1 is a general schematic view illustrating a presently preferred embodiment of the apparatus for improving or optimizing the characteristics of wetting water in offset printing according to the present invention.

With reference to the number references of the above mentioned figures, the apparatus for optimizing or improving the characteristics of wetting water in offset printing has been herein generally indicated by the reference number 100, and comprises a box-like holding body 101, holding therein the main component parts of the apparatus.

More specifically, the apparatus 100, for greatly improving and holding always constant the wetting characteristics of wetting water in offset printing has been specifically designed to adjust the pH value, without affecting the electric conductivity and vice versa.

In actually practice, Applicant has achieved this result by using acidified water which has been acidified by a specifically designed ion exchanging resin mixture, which, as exhausted, is replaced by a very simple resin replacing operation.

Owing to the above mentioned application, of very simple and inexpensive nature, Applicant has solved in a very easy manner the conductivity control problem, by using a very concentrated solution of suitably formulated components or chemical agents, by introducing in the processing circuit that amount which is strictly necessary to provide the desired or target conductivity degree, while holding the latter constant in time, without alternating the separately set pH value.

According to an important aspect of the invention, the reduction of the surface tension, has been obtained by applying an individual multiple stage magnet of very high magnetic power, which has been specifically designed, which favors the breaking of the water surface tension, thereby eliminating the limestone problem, owing to the magnetic fields affecting the salt crystallization.

More specifically, the wetting water is caused to recursively quickly flow about a plurality of related magnetic cores, and perpendicularly to their alternating magnetic field, thereby it is subjected to a series of powerful intramolecular vibrations.

Thus, the crystallization harmony is altered, and molecular cohesion broken, thereby favoring the breaking of the surface tension.

Consequently, this result allows to greatly reduce the use of isopropyl alcohol or like products, while optimizing the printing yield.

In fact, this system, together with the novel system for acidifying and controlling the electric conductivity of the printing wetting water, allows to provide very good printing results, thereby holding the printing plates always in a perfectly cleaned condition, and preventing said printing plates from being chemically etched, to provide very clear printing dots, with a satisfactory background and much more brilliant colors.

Moreover, since the recirculating system water is held in a perfectly cleaned condition, its duration will be longer, without the need of frequently replacing or making-up it.

With reference to the drawings, the feeding or supplying water provided for the printing elements, which have not been specifically shown, is automatically processed in the inventive apparatus 100 which will control, in a continuous manner, and will hold constant in time, the pH and electric conductivity values, and, moreover, said apparatus will subject said supplying water to an active filtering processing by using a vacuum filter 1. Furthermore, said apparatus 100 will subject the printing water to a powerful magnetic processing 2, in order to hold at a constant value the water quality, reduce the surface tension and prevent any fouling effect due to hard waters from occurring.

More specifically, the pH control, driven by a pH meter 3, as is clearly shown in FIG. 1, is performed by mixing the printing water with an acid pH water, taken from a basin 4, with an automatic closed circuit recover of the water level, in which said water is continuously processed and held in an acid condition by using a specifically designed ion exchanger resin mixture (Optires).

The panel instrument 3 allows the operator to set a desired or target pH value and, moreover, will indicate a resin exhaustion condition, thereby signaling the operator that the resins must be replaced.

The conductivity control, performed by the conductivity measurement device 5, is carried by supplying to the water circuit two high-concentration specifically formulated solutions, which will be hereinafter called "Optisol®" A and "Optisol®" B, which are in held in respective vessels, both indicated by the reference number 6.

The above mentioned vessels 6, in particular, are components arranged outside the apparatus 100.

More specifically, the Optisol® A solution has been designed to lubricate the blanket cylinder, and facilitate the water-ink microemulsion, whereas the Optisol® B solution has been designed for providing the wetting water with the wetting properties or characteristics required for holding the plate cylinder in a cleaned condition at the non printing regions, thereby allowing to obtain very clear and well defined printing dots at the printing regions.

According to a main aspect of the present invention, the Optisol® A solution comprises a base aqueous solution, of a comparatively high concentration, without any interference by glycols, solvents/surface active agents, in which are dissolved:

products for increasing the wetting water viscosity;
organic and inorganic salts or the like to provide an acid pH buffered solution;
a limiting product for limiting the growth of microorganisms such as algae, bacteria, molds, and so on in the wetting water.
antifoam products for preventing foam from forming in the wetting water.

On the other hand, the Optisol® B solution comprise:
a solution based on glycols/solvents, compatible with the printing operation, in which it is possible to introduce and hold in solution several surface actyive agents, included the isopropyl alcohol replacement agents, which could not be used in the aqueous solutions. In this connection it should be pointed out that the suitable and very reduced amount thereof introduced into the wetting water, and owing to the very high accuracy of the optimizer system, will render them stable, while allowing them to meet their hydrosolubility parameter requirements.

Thus, Applicant has been able to formulate a valued replacement agent for replacing isropropyl alcohol, thereby fully eliminating it from areas where printing is carried out.

This characteristic constitutes the main aim and object of the present invention.

Figure 1A:
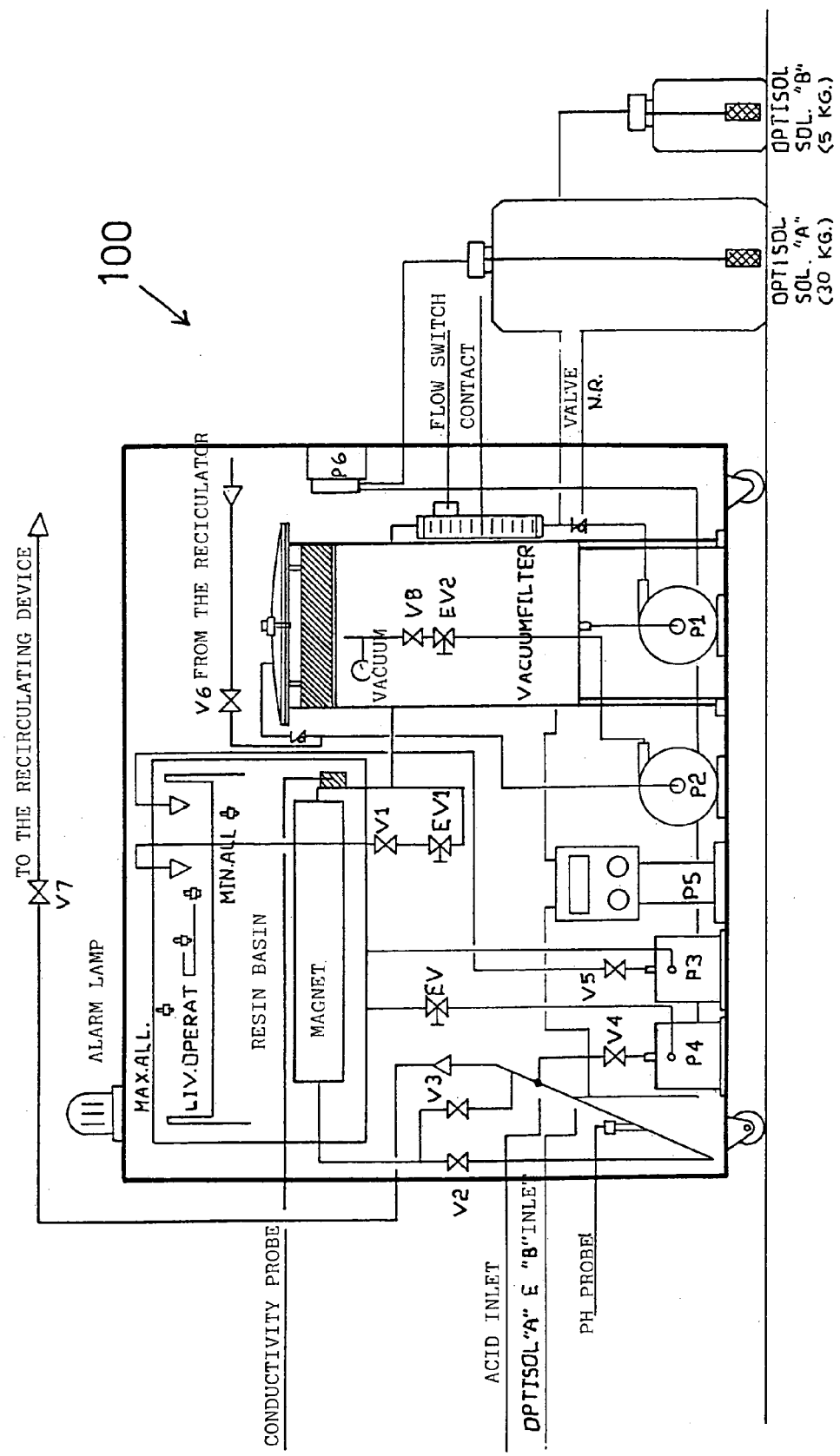
FIG. 1A shows a general flow diagram for controlling the apparatus shown in FIG. 1.
Figure 2:
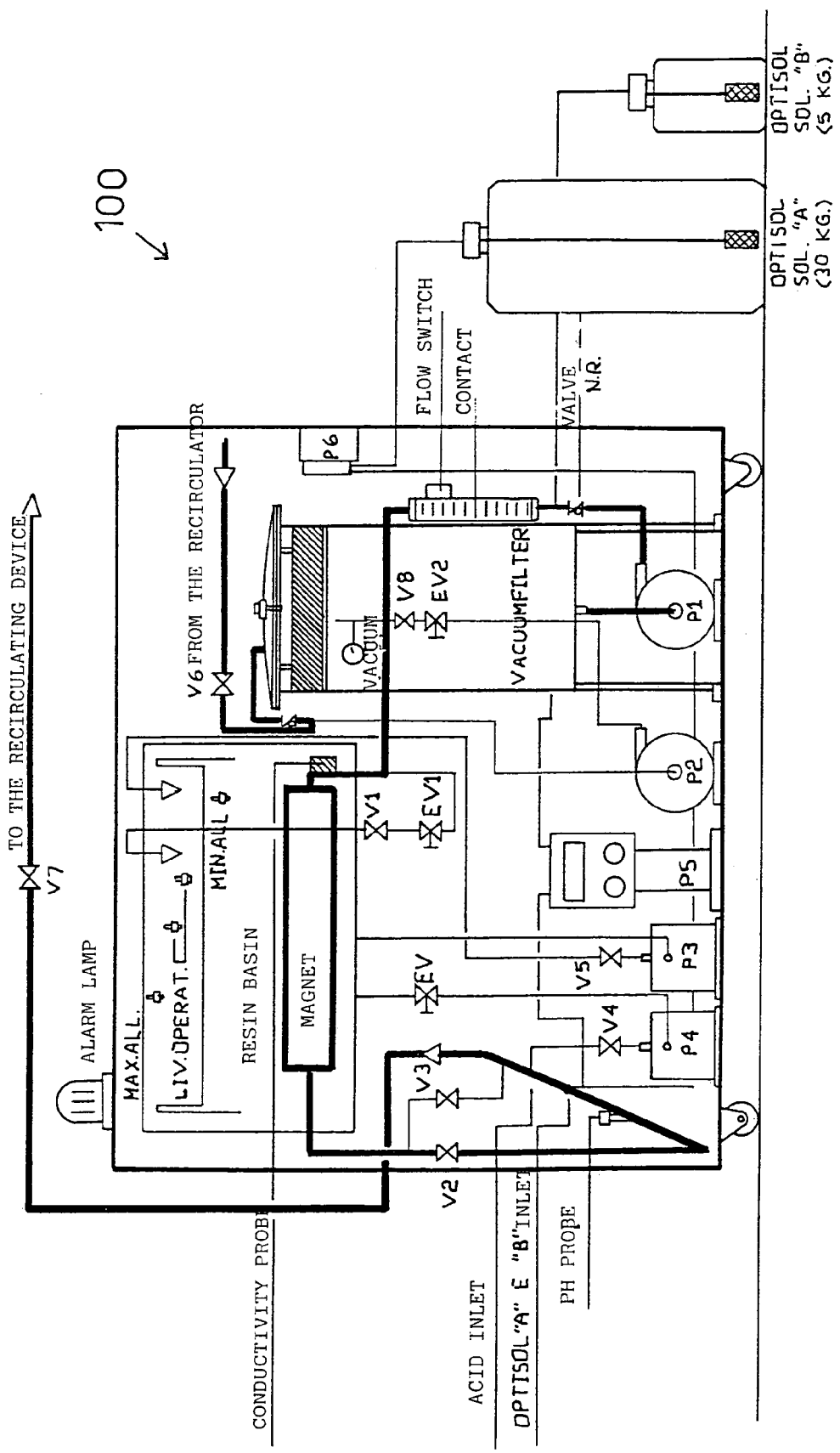
FIG. 2 shows a schematic diagram of the wetting water recirculating circuit.
Figure 3:
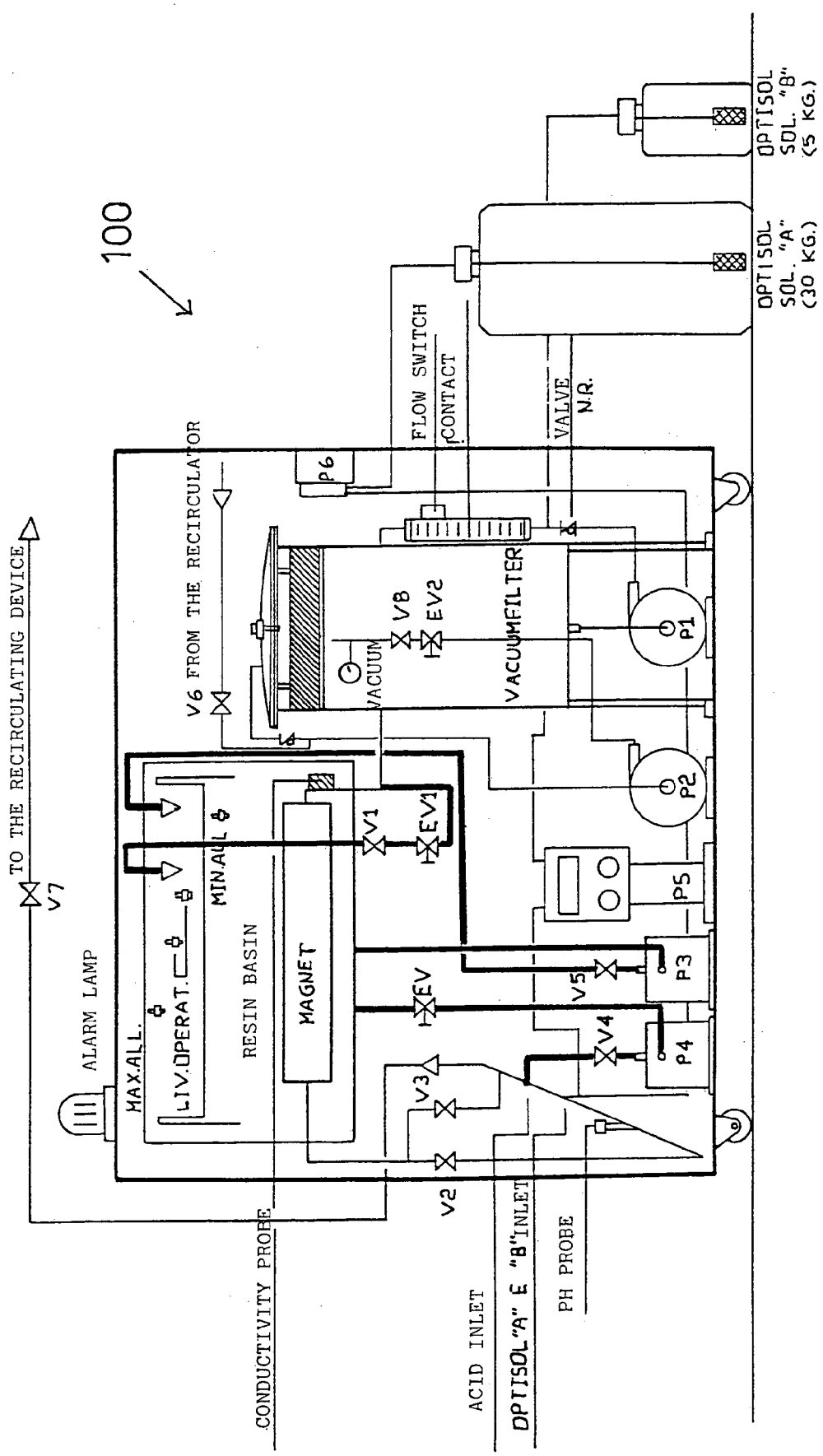
FIG. 3 shows a schematic circuit diagram of the resin basins.
Figure 4:
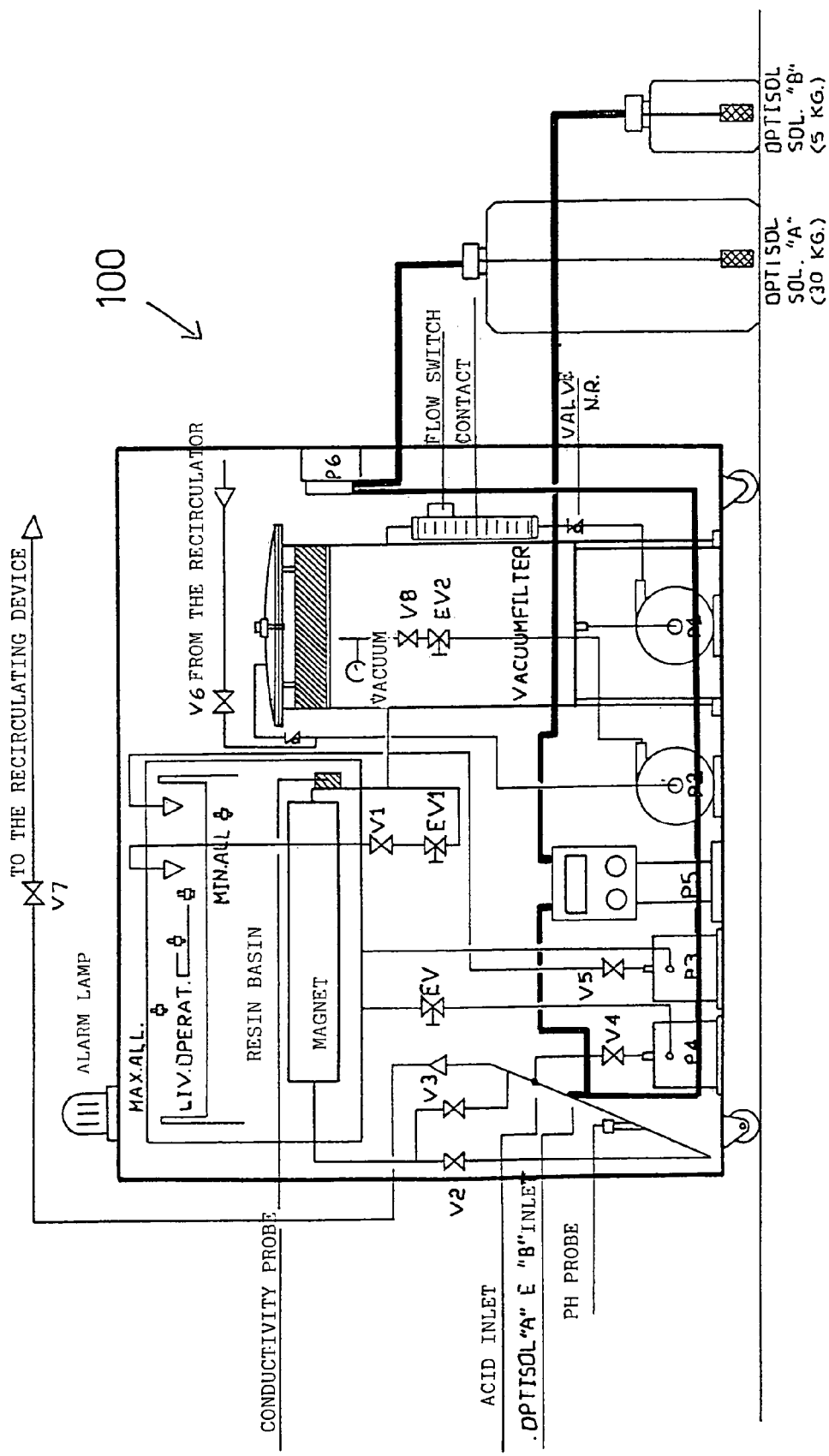
FIG. 4 shows a schematic circuit diagram related to two specifically designed approaches for improving the characteristics of the wetting water, according to a peculiar aspect of the present invention.
Figure 5:
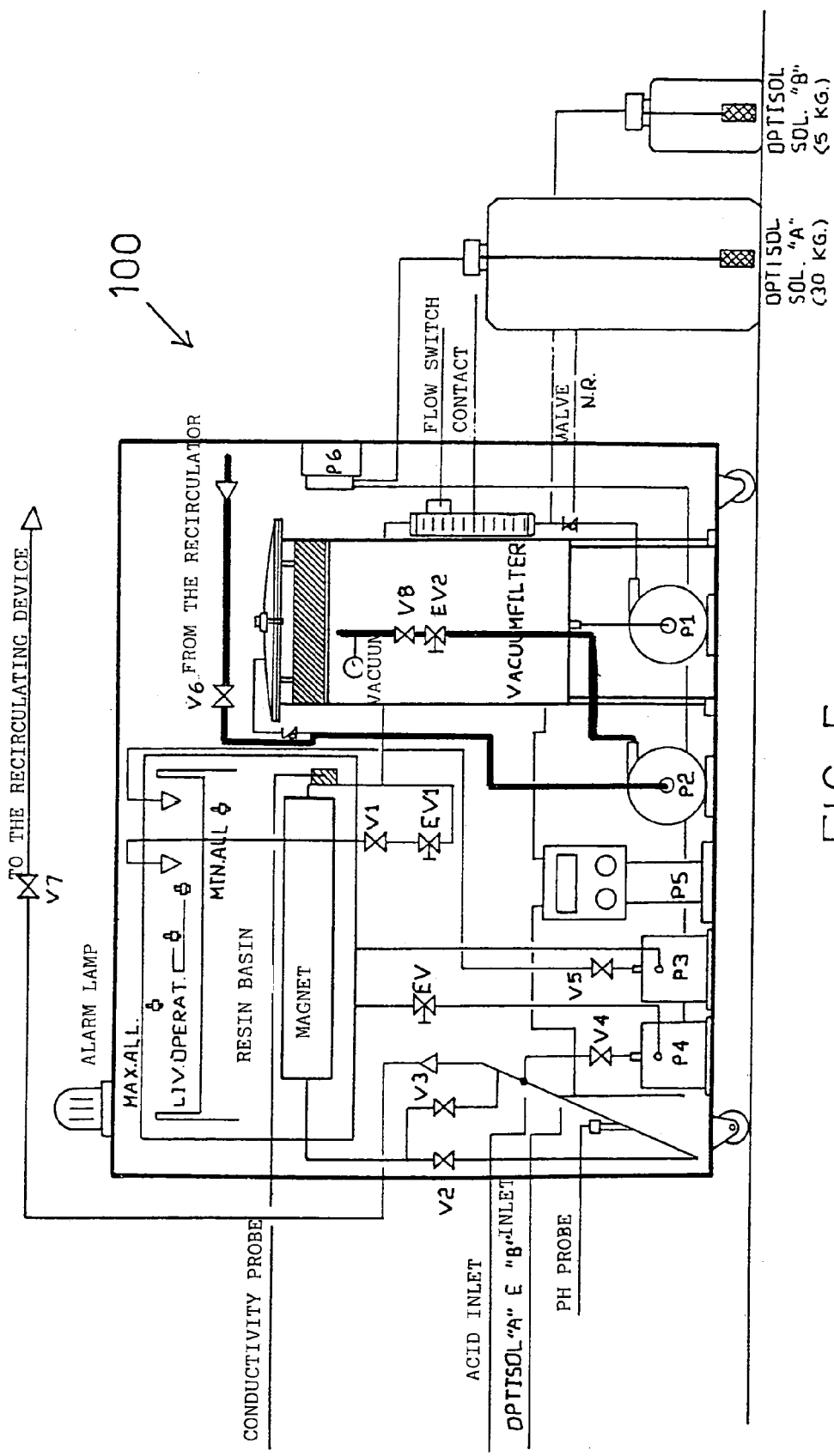
FIG. 5 shows a schematic diagram of a circuit for automatically regenerating or recovering the vacuum filter used in the apparatus according to the present invention.

More specifically, the Optisol® A solution is supplied, as for example shown in FIG. 1A by a supplying pump 7 in an amount (about 0.9%) strictly necessary for providing the electric conductivity set by the operator, whereas the Optisol® B solution is supplied, by a separated pump 8, depending on the amount of the Optisol® A solution that is used in a proportion set by the operator (usually 0.15%).

According to a further main aspect of the present invention, since the two solutions are held separated from one another, it is possible to fully eliminate the isopropyl alcohol, while allowing said solutions to be held in a stable condition, thereby preventing said solutions from becoming exhausted and thus facilitating the work of the printing machine operator, the printing machine operators controlling, depending on the specific requirements and printing means, as well as the optimum rate combination of the two disclosed solutions.

For completeness, and with further reference to the drawings, it should be pointed out that in said drawings the reference characters respectively indicate the following components:

P1—a recirculating pump; P2—a filter making up pump; P3—a resin recirculating pump; P4—an acid supplying pump; P5—a pump for pumping the Optisol® B solution; P6—a pump for pumping the Optisol® A solution; EV—an acid supplying solenoid valve; EV1—a solenoid valve for recovering the resin vessels 6 to a set resin level; EV2—a solenoid valve for recovering the filter level; V1—an adjusting valve for recovering the resin basin to a set level: V2—an adjusting valve for adjusting the pH read-out; V3—a bypass adjusting valve; V4—an acid supply adjusting valve; V5—a resin basin empting valve; V6—an inlet water shut-off valve; V7—a water outlet shut-off valve; V8—a filter recovery adjusting valve.

With respect to the other wordings of the drawings, which have not been specifically disclosed, they will be on the other hand clear to one skilled in the art.

From the above disclosure it should be apparent that the invention fully achieves the intended aim and objects.

While the method and apparatus according to the present invention have been disclosed with reference to a preferred embodiment thereof, it should be apparent that the disclosed embodiment is susceptible to several modifications and variations, all of which will come within the scope of the invention.

For example, the apparatus can be easily expanded, by adding to it known components and/or elements, to fit specific offset printing yield requirements.

The invention claimed is:

1. An apparatus for improving properties of wetting water in offset printing, said apparatus comprising, functionally interconnected to one another, supplying means for supplying wetting waterr filtering means for filtering said supplied wetting water, adapted to provide an actively filtered wetting water, magnetic means for subjecting said filtering wetting water to a continuous magnetic processing, pH control and holding means adapted to control and hold a wetting water pH at a preseL acid pH value, and electric conductivity control and holding means for controlling an electric conductivity of said wetting water, adapted to hold said wetting water conductivity to a target preset conductivity value, wherein said pH control means and electrical conductivity control means operate in an automatic fully independent manner, thereby said apparatus carries out said offset printing without using isopropyl alcohol.

2. An apparatus according to claim 1, wherein said electric conductivity control and holding means comprise first supplying means for supplying a first solution, designed for lubricating a blanket cylinder for said offset printing and to facilitate a water-ink microernuision, and second supplying means for supplying a second solution adapted to provide said wetting water with wetting properties necessary for holding an offset printing plate cylinder cleaned at not printing regions, said first and second solutions being held separated from one another, said first solution comprising a base aqueous solution, of a comparatively high concentration, without any interference by glycols, solvents/surface active agents in which are dissolved products for increasing the wetting water viscosity, organic and inorganic salts to provide an acid pH buffered solution, a limiting product for limiting a growth of microorganisms in the wetting water, and antifoam products for preventing foam from. forming in the wetting water, said second solution comprising a glycol, solvent and surface active agent mixture.

3. An apparatus according to claim 2, wherein said first and second solution supplying means comprise first pump means and second pump means, said second pump means being separated from said first pump means.

4. An apparatus according to claim 1, wherein said filtering means comprise a vacuum active filter, with automatic filter recovery means.

5. An apparatus according to claim 1, wherein said magnetic means comprise a multiple stage magnet generating a magnetic field for breaking the wetting water surface tension and preventing limestone from forming.

6. An apparatus according to claim 1, wherein said multiple stage magnet comprises a plurality of cooperating magnetic cores which are arranged perpendicularly to their alternating magnetic fields causing said wetting water to be subjected to a series of intramolecular vibrations.

7. An apparatus according to claim 1, wherein said pH control and holding means comprise a controllable pH measuring device providing a plurality of preset pH values.

8. An apparatus according to claim 1, wherein said pH control and holding means comprise tank means for holding an acid pH water and recovery means for automatically recovering the acid pH water level in said acid pH water tank means.

9. An apparatus according to claim 1, wherein said electric conductivity control means comprise an electric conductivity measuring device which can be adjusted to set a plurality of target values for said wetting water conductivity.

* * * * *